United States Patent [19]

Inagaki et al.

[11] Patent Number: 5,191,010
[45] Date of Patent: Mar. 2, 1993

[54] EMULSION HAVING DYE DEVELOPING PROPERTY

[75] Inventors: Katsumi Inagaki; Kenzo Miyamoto, both of Yokohama; Masayoshi Sekiya, Tokyo, all of Japan

[73] Assignee: Nippon Zeon Co., Ltd., Toyko, Japan

[21] Appl. No.: 601,048

[22] Filed: Oct. 23, 1990

Related U.S. Application Data

[63] Continuation of Ser. No. 264,133, Oct. 28, 1988, abandoned.

[30] Foreign Application Priority Data

Oct. 30, 1987 [JP] Japan ................................ 62-275351

[51] Int. Cl.⁵ ...................... C08L 61/04; C08L 33/12; C08L 33/20; C08K 5/13
[52] U.S. Cl. .................................... 524/510; 524/457; 524/291; 524/819; 524/841
[58] Field of Search ............... 524/510, 740, 291, 819, 524/841, 457

[56] References Cited

U.S. PATENT DOCUMENTS

| | | | |
|---|---|---|---|
| 4,131,582 | 12/1978 | Kako et al. | 524/457 |
| 4,421,660 | 12/1983 | Hajna | 524/819 |
| 4,517,347 | 5/1985 | Gowan | 524/740 |
| 4,560,714 | 12/1985 | Gajira | 524/510 |
| 4,612,254 | 9/1986 | Ginter | 524/510 |
| 4,623,679 | 11/7386 | Gimpel | 524/841 |

Primary Examiner—Michl: Paul R.
Assistant Examiner—Peter Szekely
Attorney, Agent, or Firm—Sherman & Shalloway

[57] ABSTRACT

An emulsion having a dye developing property, comprising aqueous polymer emulsion particles and contained therein, an organic dye developer.

6 Claims, No Drawings

EMULSION HAVING DYE DEVELOPING PROPERTY

This application is a continuation of application Ser. No. 07/264,133 filed Oct. 28, 1988, now abandoned.

This invention relates to an emulsion having a dye developing property. More specifically, it relates to an emulsion having a dye developing property, comprising aqueous polymer emulsion particles and contained therein, an organic dye developer.

Leuco dyes (colorless or light-colored electron donor dyes that cause color formation by donating electrons or accepting protons such as acids) and dye developers (electron acceptor compounds) have been to date utilized as recording materials for varied information recordings, especially pressure-sensitive recording and heat-sensitive recording upon making use of their color formation reaction.

A pressure-sensitive recording paper is usually composed of a coated back sheet in which microcapsules containing a colorless electron donor leuco dye and an organic solvent are coated on the back surface and a coated front sheet in which an electron acceptor dye developer that allows color formation upon reaction with the colorless leuco dye is coated on the front surface. The respective coated surfaces are opposed to each other, the coated back sheet is subjected to writing with a ball pen or typewriting with a typewriter under pressure to collapse the microcapsules, and the colorless leuco dye in the microcapsules migrates into the coated front sheet together with the organic solvent and is reacted with the dye developer to form a recorded color image on the coated surface of the front sheet. It is also possibility that a coated front and back sheet in which a dye developer layer is formed on the front surface and a microcapsules layer on the back surface is inserted between the coated back sheet and the coated front sheet to allow reproduction of plural copies. Moreover, there is a so-called single recording sheet or a single color formation paper wherein both the microcapsules and the dye developer are coated on the same surface of the sheet. What this invention terms a dye developing sheet includes all sheets containing a dye developer regardless of a mode.

These pressure-sensitive recording papers are described in U.S. Pat. Nos. 2,505,470, 2,505,489, 2,550,471 and 3,418,250.

Examples of the electron acceptor dye developer used in the dye developing sheet include acid clay minerals such as acid clay, activated clay, attapulgite and bentonite; acid polymers such as a p-phenylphenol resin; aromatic carboxylic acids such as salicylic acid derivatives; and metallic salts such as a zinc salt of an aromatic carboxylic acid (Japanese Laid-open Patent Application No. 127486/1981).

These dye developers are ordinarily used either singly or in combination. The dye developing sheets are formed by adding inorganic pigments such as Kaolin, calcium carbonate and talc to a solution containing the above dye developers, further adding binders for adhering and fixing the dye developers and pigments, optionally blending dispersants and pH adjusters to obtain dye developer coatings, coating the dye developer coatings on substrate sheets, and drying the coated sheets. Examples of the binders are aqueous high-molecular compounds such as starch, dextrin, casein, methyl cellulose, ethyl cellulose, carboxymethyl cellulose, carboxyethyl cellulose, hydroxyethyl cellulose, polyvinyl alcohol and polyacrylamide; and polymer latices such as a styrene-butadiene copolymer, a methyl methacrylate-butadiene copolymer, an acrylonitrile-butadiene copolymer, a vinyl acetate copolymer, an acrylate ester copolymer and these copolymers modified with carboxy.

Color formability of the dye developing sheets naturally depends on color formability of the dye developers, and varied novel dye developers have been proposed. From the aspects of color formability, color stability and stability of coatings, a phenolic resin and a zinc salt of a salicylic acid derivative have been lately used in particular.

The commonly used dye developers are solid at room temperature and used in the form dispersed in water.

The larger the amount of the dye developer in the dye developer coating composition the better the color formability of the dye developing sheet. However, the increase in amount of the dye developer goes economically disadvantageous. Color formability of the dye developing sheet can be increased also by minimizing the particle size of the dye developer dispersion to increase the number of the dye developer particles and the surface area of the dye developer and expedite contact with the leuco dye. Since the present dye developers are however all solid at room temperature, a mechanical dispersing method is employed to obtain the aqueous dispersion. The mechanical dispersing can hardly provide a dispersion of fine particles having good dispersion stability and necessitates a large amount of a dispersant, impairing a color formation reaction and decreasing a color concentration.

Accordingly, it is an object of this invention to provide a dye developer dispersion having improved dispersion stability and color formability.

The present inventors have made extensive studies to develop information recording materials excellent in dispersion stability, i.e. workability and color formability as leuco dye developers, and consequently found an emulsion having a much better dye developing property than ever as a leuco dye developer.

This invention thus provides an emulsion having a dye developing property, comprising aqueous polymer emulsion particles and contained therein, an organic dye developer.

The organic dye developer used in this invention may be any organic compound ordinarily used as a dye developer. Examples thereof include phenols such as p-phenylphenol, p-t-butylphenol, bisphenol A and tetrabromobisphenol A; p-substituted alkylphenol-aldehyde resins such as a p-t-butylphenol-aldehyde resin and a p-octylphenol-aldehyde resin; p-substituted arylphenol-aldehyde resins such as a p-phenylphenol-aldehyde resin and a p-cumylphenol-aldehyde resin; halogenated phenolaldehyde resins such as a p-chlorophenol-aldehyde resin; aromatic carboxylic acids such as benzoic acid, chlorobenzoic acid (o-, m- & p-), nitrobenzoic acid (o-, m- & p-), toluic acid (o-, m- & p-), 4-methyl-3-nitrobenzoic acid, 2-chloro-4-nitrobenzoic acid, 2,3-dichlorobenzoic acid, 2,4-dichlorobenzoic acid, p-isopropylbenzoic acid, 2,5-dinitrobenzoic acid, p-t-butylbenzoic acid, N-phenylanthranilic acid, 4-methyl-3-nitrobenzoic acid, salicylic acid, m-hydroxybenzoic acid, p-hydroxybenzoic acid, 3,5-dinitrosalicylic acid, 5-t-butylsalicylic acid, 3-phenylsalicylic acid, 3-methyl-5-t-butylsalicylic acid, 3,5-di-t-butylsalicylic acid, 3,5-di-t-amylsalicylic acid, 3-cyclohexylsalicylic acid, 5- cyclohexylsalicylic acid, 3-methyl-5-isoamylsalicylic acid, 5-isoamylsalicylic acid, 3,5-di-sec-butylsalicylic acid, 5-nonylsalicylic acid, 2-hydroxy-3-methylbenzoic acid, 2-hydroxy-5-t-butylbenzoic acid, 2,4-cresotinic acid, 5,5-methylenedisalicylic acid, acetaminobenzoic acid (o-, m- & p-), 2,4-dihydroxybenzoic acid, 2,5-dihydroxybenzoic acid, anacardic acid, 1-naphthoic acid, 3,5-di-alpha,-alpha-dimethylbenzylsalicylic acid, 3,5-di-alpha-methylbenzylsalicylic acid, 2-naphthoic acid, 1-hydroxy-2-naphthoic acid, 2-hydroxy-3-naphthoic acid, 2-hydroxy-1-naphthoic acid, thiosalicylic acid and 2-carboxybenzaldehyde; and polyvalent metal salts of said aromatic carboxylic acids and metals such as copper, lead, magnesium, calcium, zinc, aluminum, tin and nickel.

In this invention, a method of containing the organic dye developer in the aqueous polymer emulsion particles may be any method if it can substantially contain the dye developer in the aqueous polymer emulsion particles. There is a method wherein the dye developer is added to a reaction system when producing the aqueous polymer emulsion by emulsion polymerization, suspension polymerization or mini-emulsion polymerization (see e.g. J. Polymer Sci. Polymer Chemistry Edition, vol. 23, 2973 (1985)), a method wherein the aqueous polymer emulsion after being polymerized is mixed with an organic solvent solution of the dye developer to absorb the solution into the aqueous polymer emulsion particles, followed by removing the organic solvent, and a method wherein a solution of the polymer and the dye developer in the organic solvent is directly emulsified in water, followed by removing the organic solvent(phase inversion method).

As a method of adding the dye developer to the reaction system in polymerization, there is a method wherein in polymerizing e.g. 1,3-butadiene, styrene, methyl methacrylate, butyl acrylate, acrylonitrile, methacrylic acid and vinyl chloride, an organic dye developer having no radical polymerizability is dissolved in said monomers.

As a concrete method of containing the dye developer in the aqueous polymer emulsion particles after polymerization, there is a method wherein an aqueous polymer emulsion formed from various monomers (e.g. 1,3-butadiene, styrene, methyl methacrylate, butyl acrylate, acrylonitrile, methacrylic acid and vinyl chloride) is mixed with a solution of the dye developer in the organic solvent (e.g. benzene, toluene, ethyl acetate, methyl ethyl ketone, tetrahydrofuran, diethyl ether, cyclohexane and chloroform) to absorb the solution in the aqueous polymer emulsion particles, and then the organic solvent is removed by steam distillation or vacuum distillation.

As a method of directly emulsifying in water a solution of the polymer and the dye developer in the organic solvent, there is a method wherein a polymer (such as an acrylic polymer formed from ethyl acrylate and butyl acrylate, a petroleum resin, a phenolic resin, a polyamide, a polyester, a butadiene-acrylonitrile copolymer rubber, a butadiene-styrene copolymer rubber, a silicone polymer, or a vinyl polymer formed from styrene, vinyl acetate, vinyl chloride, vinylidene chloride, etc.) and the dye developer are dissolved in an organic solvent that dissolves both of them, an anionic surface active agent, a cationic surface active agent, an ampholytic surface active agent or a nonionic surface active agent is added to the resulting solution, and the mixture is emulsified in water through a stirrer, a colloid mill, a homogenizer or an ultrasonic wave, followed by removing the organic solvent via steam distillation or vacuum distillation.

In these methods, the amount of the dye developer is not particularly limited. It is preferably 2 to 100 parts by weight per 100 parts by weight of the polymer in the emulsion.

The thus obtained emulsion having the dye developing property is used to produce pressure-sensitive and heat-sensitive recording papers.

When the emulsion having the dye developing property is applied to, for example, a dye developing sheet of a pressure-sensitive recording paper, it is first mixed with an inorganic pigment and optionally a known dye developer to prepare a dye developer composition. On this occasion, the amount of the emulsion is preferably 5 to 40 parts by weight (as a solids content) per 100 parts by weight (as a solids content) of the dye developer composition. The aforesaid aqueous high-molecular binder may be added to the dye developer composition. Unless the effects of this invention are impaired, a known polymer latex may conjointly be used as a binder.

Subsequently, the thus obtained dye developer composition can be coated on a substrate paper by a known coating method such as an air-knife coater, a roll coater or a blade coater. The dye developer composition can be set at a coating concentration and a coating viscosity suited for a coating device to which said composition is applied. Moreover, in order to improve coatability of the coating, said composition may further contain known dispersants, defoamers, surface active agents, viscosity modifiers and antiseptics.

This invention thus provides an emulsion with a dye developing property comprising aqueous polymer emulsion particles and contained therein, an organic dye developer, and having excellent dispersion stability and color formability.

The following Examples and Comparative Examples illustrate this invention more specifically. Parts and percentages in Examples and Comparative Examples are all by weight unless otherwise indicated.

EXAMPLE 1

A pressure-resistant glass bottle having a capacity of 1 liter was charged with 400 g of deionized water, 0.8 g of sodium lauryl sulfate, 0.5 g of sodium bicarbonate, 0.5 g of potassium persulfate, 30 g of butadiene, 10 g of styrene, 60 g of methyl methacrylate, 0.5 g of t-dodecylmercaptan, 30 g of zinc 3,5-di-t-butyl salicylate and 20 g of ethyl acetate. While mixing them upon rotation, the reaction was performed at 60° C. for 15 hours. A conversion of the monomers reached 90% or more. The resulting emulsion having a dye developing property was cooled with water, and the unreacted monomers and the solvent were removed to adjust the solids content to 45%. Thereafter, pH was adjusted to 7 with NaOH. There resulted an emulsion I. An average particle size of the emulsion I was observed by an electron microscope and found to be 0.21 micron.

The emulsion I was put in a sample bottle and left to stand for 2 weeks. Dispersion stability was judged with an unaided eye. The results are shown in Table 2.

According to the formulation shown in Table 1, a coating was prepared such that a solids content of the coating reached 25%. The coating was coated in an amount of 5 g/m² (as a solids content) onto 40 g/m² of a base paper, and the coated paper was dried at 100° C. for 30 seconds to afford a dye developing sheet.

The thus obtained dye developing sheet was laminated with a commercially available coated back sheet having coated thereon microcapsules containing a colorless leuco dye. The laminated sheet was subjected to typewriting with an electric typewriter, and reflectance (%) of the typewritten surface after 1 minute was measured. Said reflectance is a scale of color formability, meaning that the smaller the value the better the color formability. The results are shown in Table 2.

EXAMPLE 2

Ninety grams of a commercially available phenolic resin "PS-2880" (a tradename for a product made by Gun-ei Kagaku K.K.) was dissolved in a solution containing 150 g of butyl acrylate, 70 g of methyl methacrylate, 80 9 of styrene, 4.0 9 of n-decane and 3.0 g of benzoyl peroxide. While stirring the mixture with a homomixer (a machine manufactured by Tokyushu Kika Koyo K.K.: 200 W) at 10,000 rpm, an aqueous solution of 3.0 g (as a solids content) of sodium alkylallylsulfosuccinate as an emulsifier and 1.0 g of sodium bicarbonate in 450 g of deionized water was gradually added. After the total amount was added, the mixture was further stirred for 10 minutes. The resulting emulsion was then treated with an ultrasonic wave homogenizer "UH-8-3" (a tradename for a machine manufactured by Chuo Ompa Kogyo K.K., 19 KHz)for 3 minutes. The thus obtained emulsion was charged in pressure-resistant glass bottle having a capacity of about 1 liter. The bottle was degassed and sealed, followed by conducting emulsion polymerization at 60° C. for 24 hours with mixing upon rotation. A conversion ratio of the monomers was 95%. The resulting emulsion having a dye developing property was cooled with water, the unreacted monomers were removed so that a solids content reached 45%, and pH was adjusted to 7 with NaOH to produce an emulsion II. An average particle size of the emulsion II was 0.87 micron.

Dispersion stability and color formability of the emulsion II were measured as in Example 1. The results are shown in Table 2.

EXAMPLE 3

The procedure in Example 2 was repeated except that a mixture of 45 g of a phenolic resin "PS-2881" a tradename for a product made by Gun-ei Kagaku K.K.) and 45 g of zinc 3,5-di-t-butylsalicylate was used instead of the phenolic resin "PS-2880". There was obtained an emulsion III. An average particle size of the emulsion III was 0.79 micron. Dispersion stability and color formability were measured as in Example 1. The results are shown in Table 2.

COMPARATIVE EXAMPLE 1

A pressure-resistant glass bottle having a capacity of about 1 liter was charged with 400 g of deionized water, 0.8 g of sodium lauryl sulfate, 0.5 g of sodium bicarbonate, 0.5 g of potassium persulfate, 30g of butadiene, 10 g of styrene, 60 g of methyl methacrylate and 0.5 g of t-dodecyl mercaptan, and the reaction was conducted as in Example 1. A latex I was then obtained.

One hundred parts of a zinc 3,5-di-t-butyl salicylate powder, 200 parts of deionized water, 2 parts (as a solids content) of sodium polyacrylate and 1 part (as a solids content) of polyvinyl alcohol were charged in a ball mill, and wet dispersed for 3 days to produce a water dispersion A. An average particle size of the water dispersion A was 2 microns.

The latex I and the water dispersion A were mixed in proportions shown in Table 1 to produce a coating. Dispersion stability and color formability of the coating were measured as in Example 1. The results are shown in Table 2.

As shown in Table 2, dispersion stability was poor and color formability was fairly low. This is presumably because the latex I and the water dispersion A were mixed according to the composition in Example 1 so that the amount of the dye developer was small and the amount of the binder latex was large.

Therefore, in Comparative Examples 2 to 4, a commercially available styrene-butadiene synthetic latex binder was used and such a formulation was employed that the amount of the dye developer was increased and the amount of the latex binder was decreased.

COMPARATIVE EXAMPLE 2

Using the water dispersion A in Comparative Example 1 and a commercially available styrene-butadiene synthetic latex binder, a coating was prepared as in Comparative Example 1. Dispersion stability and color formability of the coating were measured with the results shown in Table 2.

COMPARATIVE EXAMPLE 3

A water dispersion B was prepared as in Comparative Example 1 except that 100 parts of a pulverizate of a phenolic resin "PS-2881" was used instead of 100 parts of the zinc 3,5-di-t-butylsalicylate powder. An average particle size of the water dispersion B was 3 microns. Dispersion stability and color formability of the coating was measured with the results shown in Table 2.

COMPARATIVE EXAMPLE 4

A water dispersion C was prepared as in Comparative Example 1 except that a mixture of 50 parts of the pulverizate of the phenolic resin "PS-2881" and 50 parts of a powder of zinc 3,5-di-t-butylsalicylate was used instead of 100 parts of the zinc 3,5-di-t-butylsalicylate. An average particle size of the water dispersion C was 3 microns. Dispersion stability and color formability of the coating were measured with the results shown in Table 2.

From the results in Examples and Comparative Examples, it follows that the emulsion having the dye developing property wherein the organic dye developer is contained in the aqueous polymer emulsion particles is an emulsion having quite excellent dispersion stability and good color formability.

TABLE 1

| | Formulation (calculated as a solids content) | | | | | | |
| --- | --- | --- | --- | --- | --- | --- | --- |
| | Example | | | Comparative Example | | | |
| | 1 | 2 | 3 | 1 | 2 | 3 | 4 |
| Precipitated calcium carbonate | 100 | 100 | 100 | 100 | 100 | 100 | 100 |
| Emulsion I | 20 | — | — | — | — | — | — |
| II | — | 20 | — | — | — | — | — |
| III | — | — | 20 | — | — | — | — |
| Water dispersion A | — | — | — | 4.6 | 13 | — | — |
| B | — | — | — | — | — | 13 | — |
| C | — | — | — | — | — | — | 13 |
| Latex I | — | — | — | 15.4 | — | — | — |
| Styrene-butadiene synthetic latex binder | — | — | — | — | 7 | 7 | 7 |

TABLE 1-continued

| Formulation (calculated as a solids content) | Example | | | Comparative Example | | | |
|---|---|---|---|---|---|---|---|
| | 1 | 2 | 3 | 1 | 2 | 3 | 4 |
| Oxidized starch | 5 | 5 | 5 | 5 | 5 | 5 | 5 |
| Dispersant:Sodium polyacrylate | 0.2 | 0.2 | 0.2 | 0.2 | 0.2 | 0.2 | 0.2 |

TABLE 2

| | | Dispersion* stability | Reflectance (%) |
|---|---|---|---|
| Example | 1 | ○ | 60.8 |
| | 2 | ○ | 61.2 |
| | 3 | ○ | 61.6 |
| Comparative example | 1 | X | 77.0 |
| | 2 | X | 67.3 |
| | 3 | X | 65.4 |
| | 4 | X | 66.7 |

*○: Dispersibility is good.
X: Precipitation occurs.

What we claim is:

1. An aqueous emulsion having a due developing property, comprising emulsified polymer particles obtained by emulsion or suspension polymerization in the presence of an organic dye developer selected from the group consisting of p-phenylphenol, p-t-butylphenol, bisphenol A, tetrabromobisphenol A, benzoic acid, chlorobenzoic acid (o-, m- & p-), nitrobenzoic acid (o-, m- & p-), toluic acid (o-, m- & p-), 4-methyl-3-nitrobenzoic acid, 2-chloro-4-nitrobenzoic acid, 2,3-dichlorobenzoic acid, 2,4-dichlorobenzoic acid, p-isopropylbenzoic acid, 2,5-dinitrobenzoic acid, p-t-butylbenzoic acid, N-phenylanthranilic acid, 4-methyl-3-nitrobenzoic acid, salicylic acid, m-hydroxybenzoic acid, p-hydroxybenzoic acid, 3,5-dinitrosalicylic acid, 5-t-butylsalicylic acid, 3-phenyl-salicylic acid, 3-methyl-5-t-butylsalicylic acid, 3,5-di-t-butylsalicylic acid, 3,5-di-t-amylsalicylic acid, 3-cyclohexylsalicylic acid, 5-cyclohexylsalicylic acid, 3-methyl-5-isoamylsalicylic acid, 5-isoamylsalicylic acid, 3,5-di-sec-butylsalicylic acid, 5-nonylsalicylic acid, 2-hydroxy-3-methylbenzoic acid, 2-hydroxy-5-t-butylbenzoic acid, 2,4-cresotinic acid, 5,5-methylenedisalicylic acid, acetaminobenzoic acid (o-, m- & p-), 2,4-dihydroxybenzoic acid, 2,5-dihydroxybenzoic acid, anacardic acid, 1-naphthoic acid, 3,5-di-alpha,-alpha-dimethylbenzylsalicylic acid, 3,5-di-alpha-methylbenzylsalicylic acid, 2-naphthoic acid, 1-hydroxy-2-naphthoic acid, 2-hydroxy-3-naphthoic acid, 2-hydroxy-1-naphthoic acid, thiosalicylic acid, 2-carboxybenzaldehyde, and polyvalent metal salts of said acids.

2. The aqueous emulsion of claim 1 wherein the organic dye developer is a phenolic compound selected from the group consisting of p-phenylphenol, p-t-butylphenol, bisphenol A and tetrabromobisphenol A.

3. The aqueous emulsion of claim 1 wherein the organic dye developer is an aromatic carboxylic acid selected from the group consisting of benzoic acid, chlorobenzoic acid (o-, m- & p-), nitrenzoic acid (o-, m- & p-), toluic acid (o-, m- & p-), 4-methyl-3-nitrobenzoic acid, 2-chloro-4-nitrobenzoic acid, 2,3-dichlorobenzoic acid, 2,4-dichlorobenzoic acid, p-isopropylbenzoic acid, 2,5-dinitrobenzoic acid, p-t-butylbenzoic acid, N-phenylanthranilic acid, 4-methyl-3-nitrobenzoic acid, salicylic acid, m-hydroxybenzoic acid, p-hydroxybenzoic acid, 3,5-dinitrosalicylic acid, 5-t-butylsalicylic acid, 3-phenyl-salicylic acid, 3-methyl-5-t-butylsalicylic acid, 3,5-di-t-butylsalicylic acid, 3,5-di-t-amylsalicylic acid, 3-cyclohexylsalicylic acid, 5-cyclohexylsalicylic acid, 3-methyl-5-isoamylsalicylic acid, 5-isoamylsalicylic acid, 3,5-di-sec-butylsalicylic acid, 5-nonylsalicylic acid, 2-hydroxy-3-methylbenzoic acid, 2-hydroxy-5-t-butylbenzoic acid, 2,4-cresotinic acid, 5,5-methylenedisalicylic acid, acetaminobenzoic acid (o-, m- & p-), 2,4-dihydroxybenzoic acid, 2,5-dihydroxybenzoic acid, anacardic acid, 1-naphthoic acid, 3,5-di-alpha,-alpha-dimethylbenzylsalicylic acid, 3,5-di-alpha-methylbenzylsalicylic acid, 2-naphthoic acid, 1-hydroxy-2-naphthoic acid, 2-hydroxy-3-naphthoic acid, 2-hydroxy-1-naphthoic acid, thiosalicylic acid and 2-carboxybenzaldehyde; or a polyvalent metal salt thereof.

4. The aqueous emulsion of claim 3 wherein the organic dye developer is zinc 3,5-di-t-butyl-salicylate.

5. An aqueous emulsion having a dye developing property, comprising emulsified polymer particles obtained by emulsion polymerizing one or more monomers selected from the group consisting of 1,3-butadiene, styrene, methylmethacrylate, butyl-acrylate, acrylonitrile, methacrylic acid and vinyl chloride in the presence of an organic dye developer which is an electron acceptor that allows color formation upon reaction with a colorless leuco dye and having no radical polymerizability and which is soluble in said one or more monomers.

6. The aqueous emulsion claim 5 wherein said emulsified polymer is a copolymer of 1,3-butadiene, styrene and methylmethacrylate.

* * * * *